United States Patent [19]

Huddart et al.

[11] 4,199,984
[45] Apr. 29, 1980

[54] CAPACITIVE MEASURING APPARATUS

[76] Inventors: John Huddart; Robin Huddart, both of 4 Ingleside Grove, London SE3 7PH, England

[21] Appl. No.: 884,738

[22] Filed: Mar. 9, 1978

[30] Foreign Application Priority Data

Mar. 14, 1977 [GB] United Kingdom ............... 10597/77

[51] Int. Cl.² ............................................. G01F 23/26
[52] U.S. Cl. ................................. 73/304 C; 324/61 R
[58] Field of Search .................. 73/304 C; 324/61 R; 235/92 CC, 92 FL, 92 FQ; 364/484, 486, 562; 361/284

[56] References Cited

U.S. PATENT DOCUMENTS

| 3,140,608 | 7/1964 | Clark | 73/340 C |
| 4,080,563 | 3/1978 | Marsh et al. | 324/61 R |

FOREIGN PATENT DOCUMENTS 1399623  7/1975  United Kingdom .

OTHER PUBLICATIONS

"Modern Methods of Capacitance Measuring" by Raven Electronic Services Products Ltd.—1975.
"An Analog/Digital Integrated Circuit Interface for Automotive Sensors" by Rabe, SAE Paper No. 760069—1975.
Fielden Electronics Ltd. Catalog of "Telstor Level Controller/Indicators types E401, E402 & Ancillary Equipment".
"Digital Processing of Differential Transducer Signals" Owen Instrumentation, vol. IECI24, No. 1, Feb. 1977.

*Primary Examiner*—Charles A. Ruehl
*Attorney, Agent, or Firm*— Robert F. O'Connell

[57] ABSTRACT

Digital circuitry for use primarily in measuring the volume of gasoline in an automobile fuel tank. A measurement capacitor is mounted in the fuel tank to have its capacitance vary with the level of gasoline in the tank and forms part of a multivibrator circuit the repetition rate of which is consequently varied in an inverse manner with the capacitance of the measurement capacitor. Pulses generated in the multivibrator are fed to a counter coupled to a resetting circuit which is triggered by an output of this counter when a predetermined number of the said pulses has been counted so that a train of resetting signals are generated separated by intervals the length of which is a measure of the capacitance of the measurement capacitor. Further pulse generating means of fixed repetition rate is gated by the resetting signals and the resultant batches of pulses supplied to a digital display device which displays a reading representative of the number of pulses in each of the said batches, so that the display number is dependent on the capacitance of the measurement capacitor and hence on the level of gasoline in the tank. The capacitor is so shaped and arranged that the capacitance thereof is determined by the fuel level is representative of the volume of fuel in the tank.

6 Claims, 10 Drawing Figures

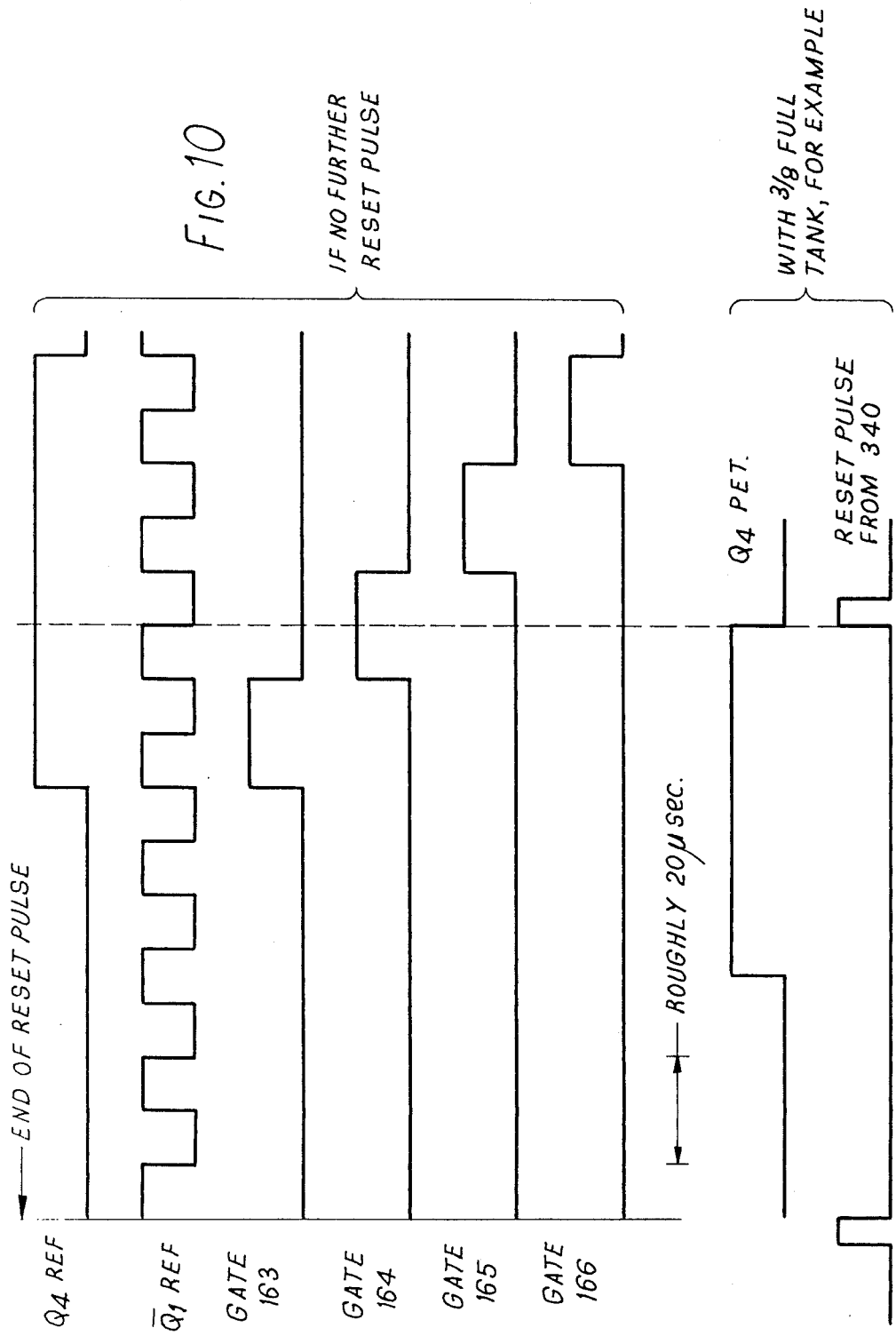

CAPACITIVE MEASURING APPARATUS

The present invention relates to capacitive measuring apparatus and particularly, but not exclusively, to the measurement of volumes in liquid fuel in fuel tanks of motor vehicles.

Methods of measuring the level of a substantially non-conductive liquid in a container, and hence the volume of the contained liquid, are known which involve the use of an electrode which extends within the container and forms a capacitor with itself and an earth electrode which may be the container or another electrode, the capacitance of the thus formed capacitor being dependent on the level of the liquid in container. A typical prior art method employs an oscillator and transistor switching circuitry to alternatively charge and discharge the capacitor to the stable voltage through a current sensitive circuit. The mean charging current is proportional to the capacitance of the capacitor and the measurement of the mean charging current is utilised to drive means calibrated for indicating volume of liquid such as an electrically driven meter.

It has been proposed in "Modern Methods of Capacitance Measuring" by Malcolum S. Raven, published in 1975 by Electronic Services and Products Limited of Braunston near Daventry, Northamptonshire, England, that the capacitance of the capacitor be measured by using the capacitor to provide the capacitance of the timing circuit of a monostable circuit, since the pulse width T of each pulse produced by the monostable circuit on triggering is given by $$T = kC_x R_t$$

where $C_x$ is the unknown capacitance, $R_t$ is the resistance of the timing circuit, and k is a constant. If an oscillator is then used to trigger the monostable circuit, the monostable circuit produces a stream of output pulses of width T, the average voltage of this output being directly proportional to T and hence to $C_x$.

In an article entitled "An Analog/Digital Integrated Circuit Interface for Automotive Sensors" published in 1975 as paper 760069 presented to the Society of Automobile Engineers, Inc., and referred to hereinafter as S.A.E. paper No. 760069, Paul R. Rabe, Eugene Greenstein and John W. Hile describe an interface circuit which can provide a proportional pulse width modulated digital signal representative of capacitance which may be the capacitance of a capacitive fuel level sensor mounted in the fuel tank of an automobile. This prior interface circuit interfaces the fuel level sensor to a microprocessor or to a conventional d'Arsonval panel meter as fuel gauge. The basic circuitry of the prior interface circuit comprises a charge pump in the form of a relaxation oscillator coupled to charge, through a buffer-drive and respective isolation diodes a reference resistance capacitance circuit and a measuring resistance capacitance circuit. Each of these resistance capacitance circuits is connected to discharge its capacitor through its resistor, and the voltage across the respective capacitance is coupled to a respective threshold detector circuit. The outputs of the threshold detector circuits are connected respectively to the inputs of an exclusive—OR gate whereby the difference between the pulse widths at the outputs of the thresholds detectors is produced at the output of the exclusive—OR gate, and this pulse width difference signal constitutes the proportional pulse width modulated signal. CMOS logic is used in the prior interface circuit since it has a very high input impedance ($10^{12}$ to $10^{14}$ ohms), a low input capacitance (5.5 picofarads), and a low output impedance (about 6000 ohms in saturation), with noise immunity of 4.45 $V_S$ where $V_S$ is the supply voltage. However, the basic design of this prior art interface circuit leaves the measurement of liquid level in difficult environments, such as the fuel tank of an automobile, open to a number of factors which cause errors in the measurement.

It is therefore an object of the present invention to provide a more reliable means whereby the volume of a substantially non-conducting liquid held in a container can be measured.

SUMMARY OF THE INVENTION

The present invention provides capacitive measuring apparatus including a capacitor which has a capacitance which varies with a parameter to be measured, the said capacitor being so included in an oscillator that the fundamental frequency of the said oscillator varies in an inverse manner with the capacitance of the said capacitor. The said oscillator forms a part of an electrical signal generating means such that, in operation, the duration of a signal repeatedly generated by the signal generating means is a measure of the said parameter. Measuring pulse generating means is so connected to the signal generating means as to receive therefrom the said signals generated thereby in operation and is such as to produce in response to each received signal a number of pulses which number is a measure of the duration of the respective recieved signal. Measurement signal generating means is so connected to the said pulse generating means so to receive therefrom each such number of the said pulse and such as to generate measurement signals related to the said numbers and representative of the parameter to be measured.

The measurement signals may constitute a visual display of decimal digits.

The said oscillator may be a relaxation oscillator, and preferably is a multivibrator. Where the oscillator is a multivibrator, the fundamental frequency will be the pulse repetition rate of the multivibrator.

For use with a dielectric liquid the electrical signal generating means preferably includes two controlled free-running multivibrators, one of which so includes the said capacitor that the pulse repetition rate of this multivibrator varies substantially inversely with the capacitance of the capacitor, and the other multivibrator is constructed to generate pulses at a reference repetition rate. These two multivibrators are connected to respective frequency division means, which may be counters, adapted to generate respective pulses which overlap for a time which varies directly with any difference between the time periods of the multivibrators. The frequency division means are connected to a suitable gate which produces an output logic signal which is present only during the said overlap. The duration of this output logic signal is converted into a number of pulses which consequently is a measure of the actual change in the capacitance of the said capacitor. This number of pulses may again be divided to produce another number of pulses which is supplied to the measurement signal generating means of this embodiment. The measuring pulse generating means may therefore comprise a third multivibrator which is gated to supply pulses only during the presence of the output logic signal to a counter arranged to provide an output pulse each time it is filled by the pulses from the third multivibrator.

An example of a dielectric liquid with which the embodiments referred to hereinbefore may be used is petrol. Petrol is substantially a perfect insulator and has a dielectric constant of substantially two. Furthermore, in common with other mineral oils, the dielectric constant of petrol has a very low dependence on temperature and on the frequency of the electric field in the said capacitor in operation. It is also found that commercially available brands of 2 star and 5 star petrol have the same dielectric constant.

The petrol tank of a motor vehicle usually contains air at atmospheric pressure, petrol vapour and petrol, or air at atmospheric pressure and petrol vapour only. For the operation of an embodiment of the invention with the said capacitor installed in such a petrol tank, the variation in capacitance of the said capacitor, when appropriately disposed, can be attributed for practical purposes entirely to variation in the level of liquid petrol in the tank. Thus embodiments of the present invention can be used as petrol gauges in motor vehicles. Embodiments may also be used as fuel gauges in vehicles using diesel oil as fuel.

The preferred form of the said capacitor for use in a petrol tank is an elongate parallel plate capacitor which is adapted to be mounted with its length vertical in the petrol tank when the tank is in its level disposition. To provide for equal increments of capacitance with equal increases in the volume of petrol in the tank, the width of the conductive areas of the plates of the capacitor is varied directly with the internal horizontal cross-sectional area of the tank. The spacing of the plates is made sufficient to prevent the surface tension of the petrol substantially affecting the level reached by petrol in the tank. Also preferably baffles are provided within the tank, arranged at least longitudinally so as to divide the tank into at least three compartments, namely, a left compartment, a central compartment and a right compartment, with the capacitor mounted in the central compartment so as to be least affected by surges of the fuel caused by cornering movements of the vehicle.

Several preferred embodiments of the present invention will now be described by way of example with reference to the accompanying drawings.

BRIEF DESCRIPTION OF THE DRAWINGS

FIG. 10 is a graphical representation of waveforms occurring in the main unit of FIG. 4.

DETAILED DESCRIPTION OF PREFERRED EMBODIMENTS

In all these embodiments, it is preferred that logic circuitry of the CMOS type be used.

Figure 1:
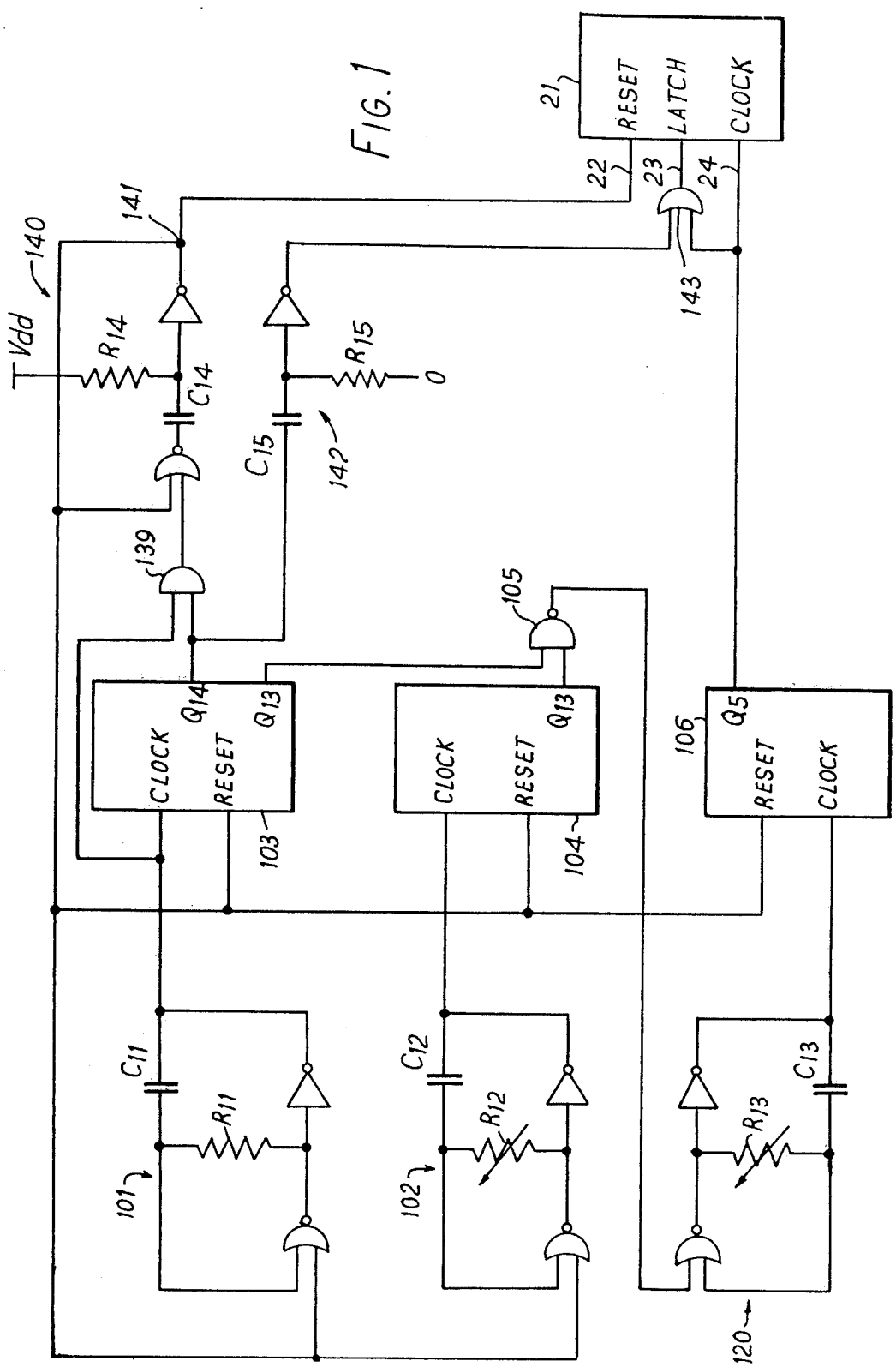
FIG. 1 is a circuit diagram of an embodiment of the invention for measuring the volume of fuel in a fuel tank.

FIG. 1 shows the logic circuit diagram of an embodiment of the invention.

A display unit 21 has a latch input terminal 23 connected to the output of a two input OR gate 143 having one input terminal thereof connected in common with a clock terminal 24 of the unit 21 to receive clock signals, and the other terminal thereof connected to the output terminal of a "latch off" circuit 142. Also the reset input terminal 22 of the unit 21 is connected to the output terminal 141 of a monostable circuit 140 having a triggering input terminal connected to the output terminal of a two input AND gate 139 having one input thereof connected in common with the input terminal of the "latch off" circuit 142 and the other input terminal thereof connected to receive a square wave generated in operation by a multivibrator 101.

The multivibrator 101 includes a two input NOR gate. The output square wave generated in operation by the multivibrator 101 is taken from an output terminal at the connection between the inverter and the capacitor $C_{11}$ of the multivibrator 101. In addition to being connected to the AND gate 139, the output terminal of the multivibrator 101 is connected to the clock input terminal of a fourteen stage negative edge triggered binary counter 103 whose reset input terminal is connected to the output terminal 141 of the monostable circuit 140.

The pulse duration of the monostable circuit 140 is determined by a capacitor $C_{14}$ and a resistor $R_{14}$. The circuit 140 is triggered by the logic "1" output of the gate 139 which corresponds to the duration of the first coincidence of a logic "1" output at a Q14 terminal of the fourteen stage binary counter 103 and a positive half-cycle of a square wave cycle of the multivibrator 101, i.e. the circuit 140 is triggered during the 16385th cycle of the multivibrator 101.

The Q14 output terminal of the counter 103 is also connected to the "latch off" circuit 142 consisting of a capacitor $C_{15}$ coupled to logic "0" through a resistor $R_{15}$ and providing a short output pulse through an inverter coupled to the connection between the capacitor $C_{15}$ and the resistor $R_{15}$. The input terminal of the two input OR gate 143 which is connected to the terminal 24 is connected to the Q5 output terminal of a five stage binary counter 106. This coupling of the Q14 output of the counter 103 and the Q5 output of the counter 106 to the latch terminal 23 effects a smoothing of the transitions in the display from one measurement reading to another, as will now be explained.

As mentioned hereinafter, the unit 21 contains a three-decade counter (not shown) whose clock input is triggered by negative-going edges arriving at the clock input terminal 24. Consequently, the count in this decade counter does not advance while the output at the Q5 terminal of the counter 106 is high but only when a transition from high to low occurs.

The latching of the display unit 21, i.e. the holding of the displayed value regardless of a change in the contents of the decade counter in response to signals received at the reset terminal 22 or clock terminal 24, occurs whenever a logic "1" signal is present at the latch terminal 23, and not otherwise. The output terminal of the OR gate 143 provides a logic "1" signal whenever either one or both of the "latch off" circuit 142 and the Q5 output terminal of the counter 106 are providing logic "1". This Q5 terminal is at logic "1" during all measurements which are between a measurement value coinciding with a value which can be displayed exactly, e.g. 12.60 gallons, and halfway between this value and the next value below, e.g. halfway between 12.60 gallons and 12.50 gallons, i.e. 12.55 gallons. Consequently a change in the displayed value can only occur when the measured value is between a value which can be displayed exactly and halfway between this value and the next such value above, e.g. between 12.50 gallons and 12.55 gallons. As a result, when the fuel tank is being filled, the display of the display unit 21 lags up to one measurement unit, e.g. 0.1 gallons behind the measurement value and changes by one measurement unit just after the measurement value has increased by one measurement unit i.e. just after increasing from 12.50 gallons to 12.60 gallons, and when the fuel tank is emptying, the display holds the nearest displayable value e.g. while the volume decreases from a measurement value of 12.65 gallons to one of 12.55 gallons, the display is 12.6 gallons.

The connection of the output terminal of the "latch off" circuit 142 to the OR gate 143 ensures that the reset signal to the unit 21 is not effective at last until a predetermined time after the completion of a 'O' (latch off) signal from circuit 142 to gate 143. The duration of the pulse produced by the "latch off" circuit 142 is therefore chosen to be substantially less than one half-cycle of the multivibrator 101 and therefore to have been completed before the monostable 140 is triggered by the AND gate 139.

In an embodiment as shown in FIG. 1 and with the particular values of resistance and capacitance mentioned hereinafter, the "latch off" circuit 142 may have a capacitor $C_{15}$ of 500 picofarads and a resistor $R_{15}$ of 20 kilohms. The counters 103, 104 and 106 may each be a Motorola MC 14020. The capacitor $C_{11}$ is in this embodiment the capacitor mounted in a fuel tank and its leads, so that the repetition rate of this multivibrator 101 varies inversely with the volume of fuel in the tank. In addition to being connected to the AND gate 139, the output terminal of the multivibrator 101 is connected to the clock input terminal of a fourteen stage binary counter 103 whose reset input terminal is connected to the output terminal 141 of the monostable circuit 140.

Since the repetition rate of the multivibrator 101 varies substantially inversely with the volume of fuel, the duration of a logic "1" signal at the Q13 output terminal of the counter 103 varies linearly with the volume of fuel, and it is therefore this output terminal of the counter 103 which is connected to a two input NAND gate 105 which is comparable in function to the EXCLUSIVE OR gate in SAE publication 760069.

A reference multivibrator 102 having the same general construction as the multivibrator 101, except that its capacitor $C_{12}$ is a reference capacitor of fixed capacitance, and its resistor $R_{12}$ is of adjustable resistance, has its output terminal connected to the clock input terminal of another fourteen stage binary counter 104. The Q13 output terminal of the counter 104 is connected to the other input terminal of the NAND gate 105.

The reset input terminals of the counters 103 and 104 are connected to the output terminal 141 of the monostable circuit 140. One respective input terminal of each of the NOR gates of the multivibrators 101 and 102 is also connected to the output terminal 141. Thus the generation of a pulse by the monostable circuit 140 resets the counters 103 and 104 and at the same time inhibits the multivibrators 101 and 102.

The Q14 output terminal of the counter 103 is connected to one input terminal of the AND gate 139. Thus the monostable circuit 140 is triggered by the first positive half cycle of oscillation of the multivibrator 101 after the output at the Q13 terminal of the counter 103 has gone low, i.e. to logic "0".

The output terminal of the NAND gate 105 is connected to one input terminal of a two input NOR gate in a third multivibrator 120 which is of the same general construction as the multivibrator 102, having a fixed capacitor $C_{13}$ and an adjustable resistor $R_{13}$. The multivibrator 120 oscillates while there is a logic "0" signal at the output terminal of the NAND gate 105, and is inhibited while there is a logic "1" at that terminal.

The output terminal of the multivibrator 120 is connected to the clock input terminal of the counter 106 whose Q5 output terminal is connected to the clock input terminal of the display unit 21. The reset input terminal of the counter 106 is connected to the output terminal 141 of the monostable circuit 140.

It is arranged that, when the fuel tank (not shown), is nominally empty, the output signal logic "1" at the Q13 output terminal of the counter 104 lasts for twice the time of the logic "1" signal at the Q13 output terminal of the counter 103. This is ensured by setting the multivibrator 102 to oscillate at half the rate of the multivibrator 101 when the tank is nominally empty. As the fuel tank is filled up, the rate of oscillation of the multivibrator 101 falls until, when the tank is full, the multivibrator 101 oscillates at substantially the same rate as the multivibrator 102. This relationship, caused by the dielectric constant of petrol being at 2, twice that of air, is obscured if the capacitance of the leads to the capacitor $C_{11}$ is a significant fraction of the total capacitance of $C_{11}$.

The counters 103, 104 and 106 are reset by the positive pulse generated by the monostable circuit 140, this pulse being timed to occur before a second logic "1" signal is produced at the Q13 output terminal of the counter 104.

The presence of a logic "1" signal at one input terminal of the respective NOR gate in the multivibrator 101 or 102 or 120 prevents oscillation of that multivibrator. Hence whenever the monostable circuit 140 is generating a pulse, the multivibrators 101 and 102 are inhibited, and whenever the NAND gate 105 is producing a logic "1" output signal the multivibrator 120 is inhibited. The NAND gate 105 only produces a logic "0" signal while the logic "1" signals at the two Q13 output terminals are overlapping. The total duration of this overlap is a measure of the volume of fuel in the fuel tank and is measured by the number of oscillations produced during the overlap by the multivibrator 120. This number is scaled down by the counter 106 and passed to the display unit 21.

The logic gate 105 is included in the circuit shown in FIG. 1 in order to aid understanding of the working of this circuit and because it is equivalent to the EXCLUSIVE OR gate used to detect overlap of the main and reference monostable pulses in S.A.E. paper No. 760069. In practice, in the basic system described with reference to FIG. 1, the synchronisation of the two counters 103 and 104 is provided by their simultaneous resetting by the monostable circuit 140 and the subsequent waveforms of their Q13 outputs is such that the Q13 of counter 103 is always high, logic "1", when the Q13 of the counter 104 is high. The end of their period of overlap occurs at the end of the high period of the Q13 output of counter 103 when the reset monostable circuit, 140, is triggered anew. This, of course, resets the Q13 output of counter 104 to logic "0" almost instantaneously.

The function of the multivibrator 101 and the counter 103 can thus be seen only to provide "latch off" and "reset" pulses via circuits 142 and 140 respectively at the appropriate times. The duration of the Q13 "1" logic level of counter 104, if any, terminated by the reset pulse, is controlled by the time period of multivibrator 102 and is adjusted by a zero reading adjuster resistor $R_{12}$. The actual reading is controlled by the time period of multivibrator 120 and is adjusted by a gain control resistor $R_{13}$.

The use of high Q values such as Q13 as in FIG. 1 is occasioned by the desire to have the final displayed reading the result of summing the duration of thousands of individual multivibrator oscillations in the very "noisy" automobile environment. The addition of many oscillations helps average out random variations in duration of individual oscillations caused by inductive and power line noise on the multivibrator circuits. The size of the "overlap" pulse in the simple monostable circuit described in S.A.E. No. 760069 must be considerable if even a very fast multivibrator is to be gated in to provide readings in excess of, say, 10.0 gallons. This requires large values of the capacitor in the tank and of the resistor in the main monostable circuit leading to, respectively, expense, and vulnerability to conducting impurities in the petrol or to conducting films of moisture over the capacitor plates in the tank. This difficulty can be partly circumvented by rendering the final display in coarser units, whole gallons, or even half or quarter gallons but one of the advantages of the digital gauge, that of allowing m.p.g. calculation over short distances is then lost. The summing of thousands of individual oscillations to provide single long pulses allows the use of small-value components in our multivibrator circuits. The use of the particular Q values shown in FIG. 1 is for compatability with FIG. 3 to be described hereinafter and the reasons for choosing those Q values is explained in the description of FIG. 3. The use of multivibrator circuits in the embodiment of this invention shown in FIG. 1 in preference to monostable circuits is due to the following reasons:

(a) The prior art method of providing a digital reading of an unknown capacitance determined by the time period of a monostable pulse is by gating in the output of a multivibrator (see Modern Methods of Capacitance Measuring by M. S. Raven published in 1975 by Electronic Services and Products Limited of Brannston, near Daventry, Northamptonshire, England.) The separate effects of ageing, temperature and in particular power-line voltage between the frequency of multivibrator and monostable circuits are different. The use of multivibrator circuits throughout provides a high degree of self-compensation of the unit to these effects.

(b) Multivibrator circuits do not require triggering by an exterior trigger circuit. This means that the multivibrator circuitry shown in FIG. 1 spends well over 99% of the time sampling the fuel level in the tank. The simple monostable circuit in S.A.E. 760069 spends considerable periods of time idle between trigger pulses from the charge pump.

(c) A current leak may develop to earth from the vulnerable "a," i.e. non-earthed, side of the parallel plate capacitor in the tank, equivalent to a high value resistance from there to the earth of the motor vehicle, which may be positive or negative. Such a leak might be formed by the condensation of moisture on the plates of the capacitor for example. In a monostable circuit configuration such a leak would either increase or decrease the time period of each cycle of operation by the same amount leading to an error in the reading in the same proportion. In our multivibrator circuit configuration the polarity of the parallel plates is continually reversed, each plate spending approximately equal periods of time at a higher value than the logic threshold than at a lower value than the logic threshold. The leak would alternately increase and decrease the two pulses of each complete cycle. The effect of such leaks on the reading is thus much reduced.

(d) Similar considerations as in (c) apply when the effect of transients in the power line (very common in motor vehicles) on the asymmetric operation of monostable circuits is compared with that on the symmetric operation of multivibrator circuits.

(e) The prior art method requires the duration of a single monostable pulse to define the reading. This duration will include any error due to "noise". The multivibrator configuration requires the duration of thousands of closely occurring pulses which include the summation of thousands of individual errors to define the reading and hence the effects of random errors are cancelled out.

Figure 2:
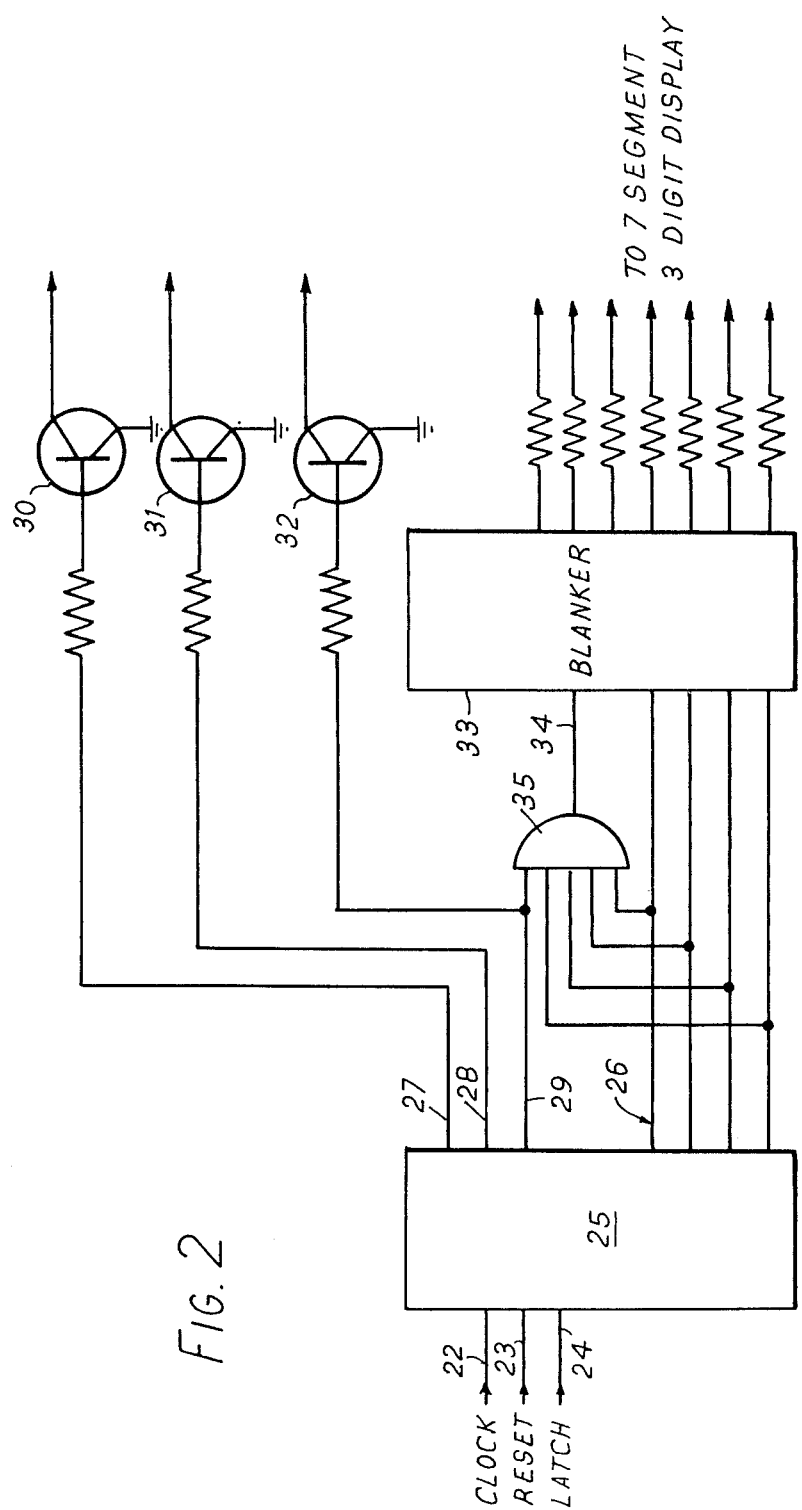
FIG. 2 is a more detailed circuit diagram of a display unit of the embodiment of FIG. 1.

FIG. 2 shows the logic circuitry of the display unit 21. The clock, reset and latch input terminals 22, 23 and 24 are the signal input terminals of a counter-multiplexer 25 which has four binary-coded-decimal output terminals 26 which in operation provide four binary signals in a code representing one of the decimal numbers 0, 1 to 9 and three scanning output terminals 27, 28 and 29 at which the combinations of logic signals 001, 010 and 100 appear in succession to switch on, one at a time in succession, three PNP transistors 30, 31 and 32 whose bases are coupled respectively to the terminals 27, 28 and 29 through resistors. The terminals 26 are connected to the four input terminals of a binary-coded-decimal display driver 33 of a seven segment per digit three digit decimal light emitting diode display (not shown) of the common cathode type. The common cathode of the units digit segments is coupled to the emitter of the PNP transistor 30, the common cathode of the tens digit segments is coupled to the emitter of the PNP transistor 31, and the common cathode of the hundred digit segments is coupled to the emitter of the PNP transistor 32.

The driver 33 has a blanker input terminal 34 and blanks the segments whenever a logic "1" signal is being supplied to the terminal 34. This facility is used to prevent the hundreds digit zero being displayed, the terminal 34 being connected to the output terminal of a five-input AND gate 35 whose inputs are connected respectively to the four terminals 26 and to the terminal 29 of the counter-multiplexer 25.

The counter-multiplexer 25 includes three negative-edge triggered binary-coded-decimal decade counters that are cascaded synchronously, each having a latch unit, coupled to the latch terminal 24 at its output to permit storage of any given count. The unit includes an oscillator which provides a low frequency scanning clock output which drives a multiplexing output selector coupling the outputs of the latch units to the terminals 26 and arranged to select, one at a time in sequence, the numbers stored in the three latches. The clock input terminal 22 is connected to the clock input of the first decade counter, and the reset input terminal 23 is connected to the respective resetting inputs of the three counters. A suitable integrated circuit chip for use as the counter-multiplexer 25 is the Motorola MC 14553. The display driver 33 may be a Motorola MC 14511.

Suitable values of resistance and capacitance in FIG. 1 may be (petrol tank full).

$R_{11} = 100$ kilohms
$C_{11} \approx 1000$ picofarads
$R_{12} = 100$ kilohms
$C_{12} = 1000$ picofarads
$R_{13} = 500$ kilohms
$C_{13} = 1000$ picofarads
$R_{14} = 100$ kilohms
$C_{14} = 500$ picofarads
$R_{15} = 20$ kilohms
$C_{15} = 500$ picofarads An advantage of this circuit is that the resistance of the resistor $R_{11}$ may be as low as 5 kilohms. Such a low resistance would be useful if the fuel, due to containing a small percentage of conducting additives, for example alcohol, contributed a significant resistive component in parallel with the capacitor $C_{11}$.

In a motor vehicle, the leads which form part of the capacitor $C_{11}$ and connect the capacitor which is mounted in the fuel tank to the other elements of the multivibrator 101 can be two lengths of wire, each substantially two meters long, the two lengths being shielded so that the leads have constant capacitance. For example, a two meter length of shielded two-strand polythene cable may be used. This example provides substantially 100 picofarads per meter of cable between the wires and the shielding and does not vary even when the cable is immersed in water, bent, shaken or placed near to charged surfaces. However, cables using PVC should be avoided since PVC normally contains a plasticiser which has a capacitance that varies with ambient temperature and with frequency.

Although FIGS. 1 and 2 show only logic gates, some of these gates can of course be replaced by diode arrangements having the same functions.

In FIG. 1 the variable part of the capacitor $C_{11}$ is a parallel plate capacitor which is so mounted in a fuel tank, for example the petrol tank of a motor vehicle, so as to be immersed in the fuel to an extent which varies with the volume of fuel in the tank. The electric power stored in operation in this capacitor in use is very small, for example $5 \times 10^{-8}$ joules, where the fuel is petrol. A conventional sparking plug requires $5 \times 10^{-3}$ joules to create an ignition spark. Obviously the discharging of the capacitor's energy inside the fuel tank must not be capable of causing ignition of the fuel. The plates of the capacitor may be coated with a layer of insulating material as an additional precaution.

Figure 5:
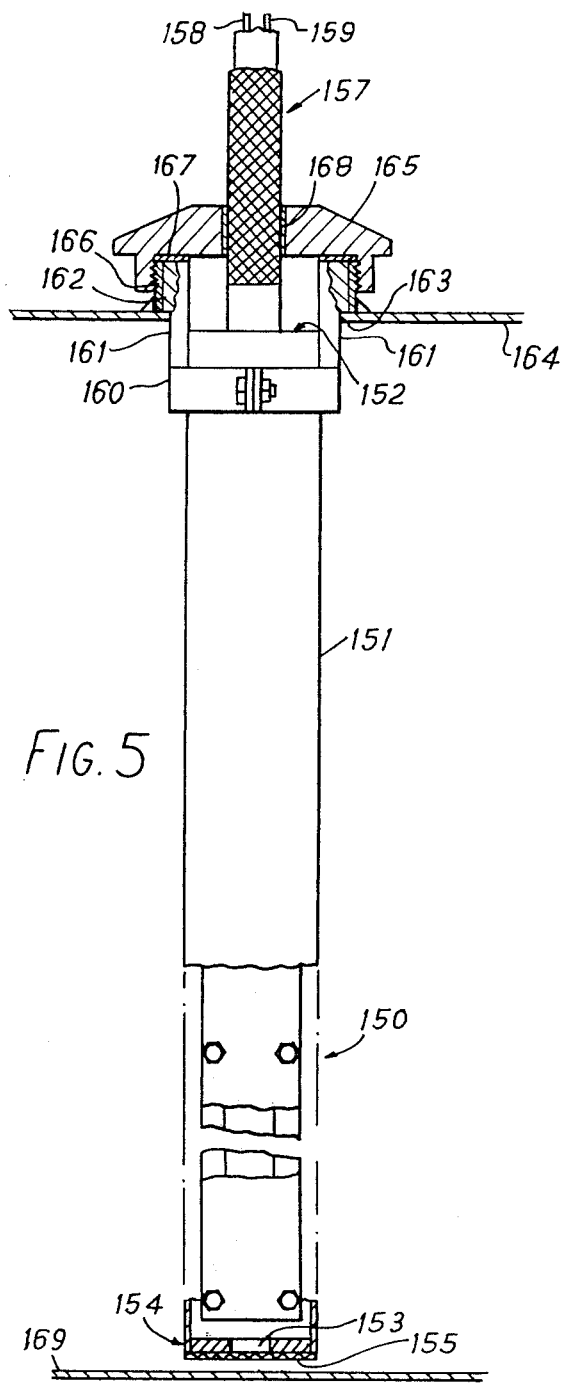
FIG. 5 is a partly sectional side view of a measurement capacitor for use in an embodiment of the invention and mounted in a fuel tank.

One form of a capacitor mounted in a fuel tank for the purposes of this invention is illustrated in FIG. 5.

Figure 6:
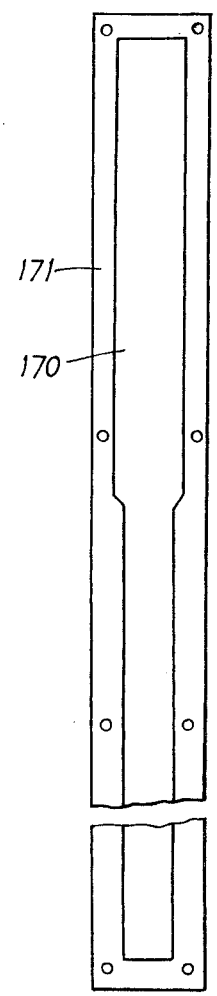
FIG. 6 is a side view of part of the measurement capacitor of FIG. 5.
Figure 7:
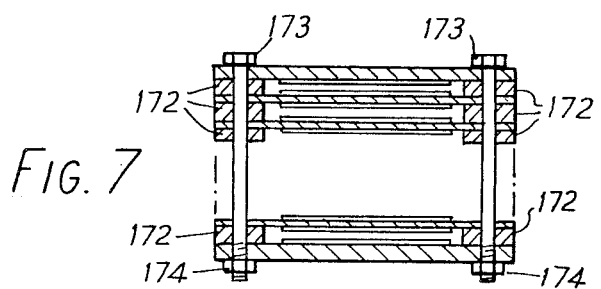
FIG. 7 is a cross-sectional view of the measurement capacitor of FIG. 5.

The capacitor shown in FIG. 5 is elongate and consists mainly of a plurality of printed circuit boards 150 all except two of which have copper on both faces, one board being shown in FIG. 6. The copper is plated with nickel for example to prevent corrosion. A transverse section through a few of the printed circuit boards is shown in FIG. 7 from which it can be seen that each end board has only one face with copper, and the copper faces of the boards are spaced apart. The boards 150 are mounted in a rectangular section tube 151 of insulating material, for example polymethyl methacrylate, which is open at its top end 152, and has an aperture 153 at its bottom end 154.

Figure 3:
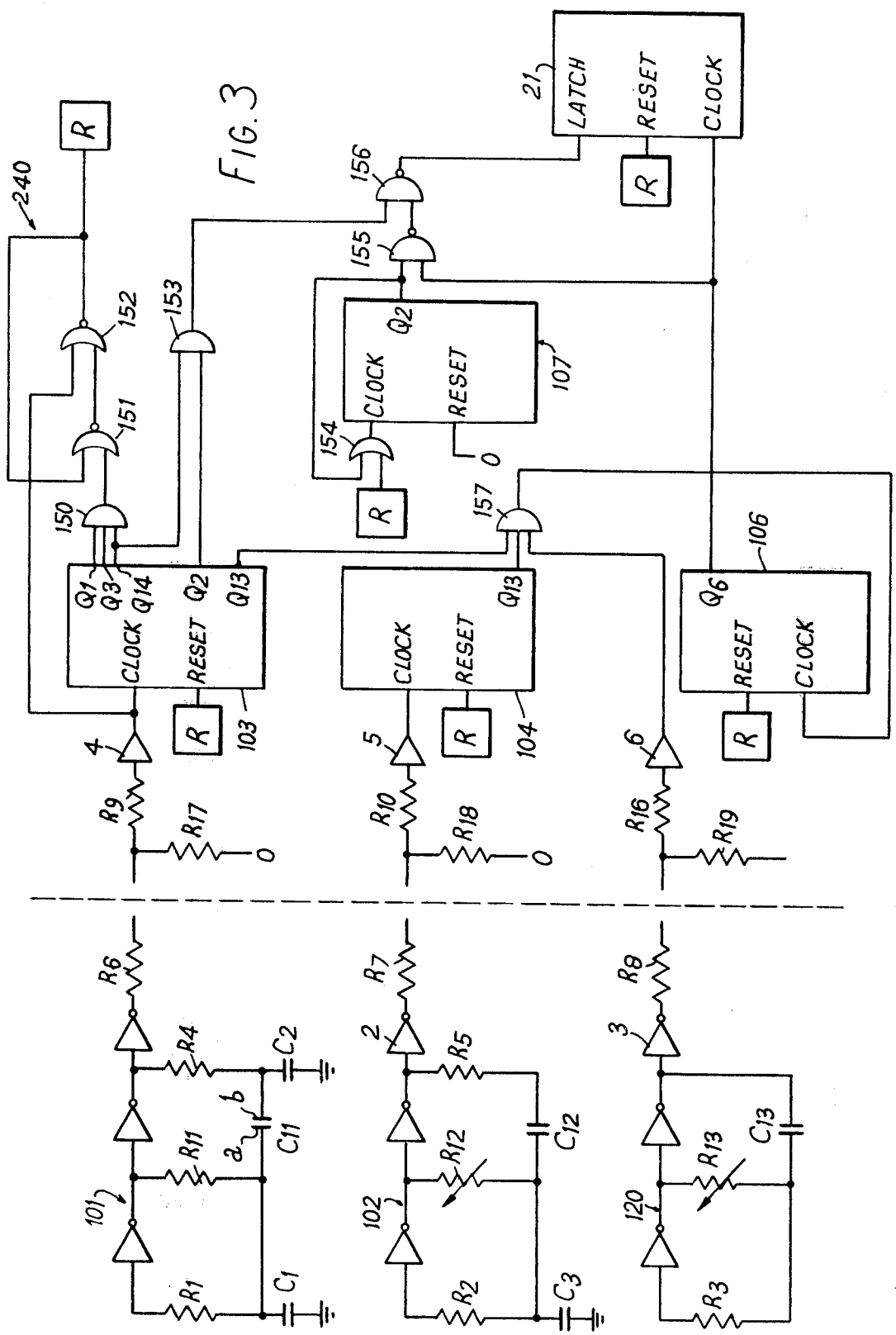
FIG. 3 is a circuit diagram of another embodiment of the invention for measuring the volume of fuel in a fuel tank and having a preferred physical arrangement.

It is preferable to use an odd number of plates with the central plate connected at "a" of FIGS. 1 and 3. This means that the two outermost plates are connected at "b" of FIGS. 1 and 3 which screens the inner plates from electrical noise. Side "b" is always held at a constant voltage (high or low) via a low impedance (output gate ~500Ω) and any noise or variation of capacitance with respect to earth has much less effect on the multivibrator for plates of side "b" rather than side "a".

For a regularly shaped tank i.e. rectangular or circular cross-section, the liquid depth, relative to the depth of the tank will remain constant at the mid-point of the tank's horizontal cross-section in respect of tilt in any direction provided none of the bottom of the tank becomes exposed or none of the top of the tank becomes submerged. Hence the locus of midpoints, i.e. a vertical line, is the best position for the capacitor in the tank.

For more irregularly shaped tanks the locus of midpoints is still the best position with respect to minimum (not necessarily zero) change in level with tilt but this line, need not be straight or vertical.

The parallel plate design of the level sensing capacitor lends itself well to adaptation for such irregularly shaped tanks, compared with for instance, capacitors of tubular shape. The necessary bends in the shape of the capacitor are most easily incorporated if made in the plane of the plates themselves. A filter 155 is secured over the aperture 153 to keep debris out of the tube 151.

A two wire shielded cable 157 is connected to the coppered surfaces of the boards 150, one of its wires 158 being connected to one set of the coppered surfaces, and the other wire 159 being connected to the other set, the two sets comprising the interleaving surfaces.

The tube 151 is mounted in the fuel tank by means of a clamp 160 having a mounting ring 161 connected thereto by a plurality of bars 162. The mounting ring 161 is held against the annular rim 163 of a circular hole in the upper wall 164 of the fuel tank by a cap 165 which engages by means of a screw thread with a circular screw threaded wall 166 surrounding the rim 163. An annular sealing member 167 is clamped between the top of the ring 161 and the inner face of the cap 165. The cable 157 passes through a journal 168 at the centre of the cap 165.

When mounted as shown in FIG. 5, the top ends of the tube 151 and the boards 150 are close to the upper wall 164 of the tank, and their bottom ends are close to the bottom wall 169 of the tank.

To eliminate the effect of variation in horizontal cross-sectional area of the interior of the tank, the horizontal dimension of the copper coatings of the boards 150 is varied, as shown for example in FIG. 6 where a copper coating 170 on an insulating substrate 171 has a lower portion of reduced width, so that equal increments in the volume of fuel result in equal increments in the area of copper coating below the horizontal surface of the fuel in the tank.

As shown in FIG. 7, the boards 150 are spaced from one another by interposed strips 172 at the edges of the boards, the strips 172 and the boards being held together by bolts 173 and nuts 174. The thickness of the strips 172 is, where the fuel is petrol, 0.8 millimeters so that the spacing of the boards is too large for the surface tension of the fuel to substantially affect the level to which the fuel rises in the capacitor.

In a petrol tank, for example, the capacitor should have an empty capacitance of at least 500 picofarads, and a full capacitance of at least 1000 picofarads, with the cable 157 adding a further fixed amount of substantially 200 picofarads.

A capacitor as described with reference to FIGS. 5 to 7 may have a total coppered surface area of 700 square centimeters provided by the boards 150 which may number at least nine and be substantially 3 centimeters wide. The side edges of the coppered surfaces should be at least 1 millimeter from the internal surfaces of the tube 151.

Single surges due to cornering cause up to 0.5 gallons change in the fuel reading of a modern automobile with a shallow fuel tank with the gauge adjusted to the 20 second standard mentioned hereinafter. For a nearly full tank this value is less and for a nearly empty tank this value is more. The effect of surges due to cornering can be eliminated by the use of two baffles placed longitudinally in the tank so as to divide it into three compartments. These baffles, otherwise similar to the baffles already to be found in automobile fuel tanks, have a smaller area of perforation than these known baffles, so that for short time periods of roughly five seconds, the liquid in the tank behaves as if it were in three separate tanks. Accelerating the automobile to the right causes the liquid level in the right compartment to fall while the level in the left compartment rises and the level in the central compartment remains constant. The central compartment is preferably made relatively small to minimise the effect of surges within this central compartment itself.

The tank may be further divided into three in a similar manner by placing two baffles in transverse planes to prevent the effect of surges due to violent braking or acceleration. Thus for competitive driving the tank may be divided as described into a total of nine compartments with the sensing capacitor in the central compartment.

The container 151 of FIG. 5 may be discarded and the unit of FIG. 7 itself used to contain the fluid reservoir which is sealed top and bottom. The top contains a very small hole to allow air to flow. The small hall at the bottom is designed to allow the final reading obtained at a petrol station after refuelling to take no more than about 20 seconds (a matter of viewer preference). This allows adequate damping for bumpy roads and normal usage but not for cornering at speed causing surges in the fuel in the tank without the baffles.

It is noted that the average level at the centre of a car tank without baffles for continuous "hard" driving can be typically 1 cm less than the true level over any time period provided the tank is not near full. Hence any amount of damping of the reading i.e. by restricting the size of the hole in the condenser plate reservoir or by electronic means is not sufficient on its own to give accurate readings.

If the fuel gauge is to be used in very hostile environments where for instance tropical humidity may cause condensation on the plates or careless operators are likely to accidentally fill the tank with water or other fluid, the following additions can be made. An inflatable bag of polythene or petrol-resistant rubber may be placed over the upper end of the capacitor effectively sealing off the air within the capacitor from exchange with the atmosphere. A similar bag may be placed over the lower end of the capacitor, containing sufficient petrol to fill the condenser. If this bag is sufficiently flexible, addition of free petrol to the tank will compress this bag until the level of enclosed petrol in the capacitor is the same as to the level of the free petrol in the tank. This system has the advantage that either or both bags may rupture with no harm to the motor vehicle and having the effect only of returning the capacitor to its original unprotected state. This system also has the potential of being filled with mixtures other than petrol and air for special purposes, and of being used for the measurement of the level of any liquid.

With respect to most conceivable applications, the measurement capacitor will be at least several meters from the display. It is possible to split the electronics at various positions and interconnect with electrical wiring (cables). The embodiment of FIG. 1 may have all the electronics with the display and the capacitor $C_{11}$ connected by two long screened cables. This design has a weakness in that the cables may be damaged or eroded in some way in a hostile environment such as to affect its capacitance and hence the reading. The capacitor itself must be large, as shown in FIG. 7 in order to swamp the capacitance of the long cables. Another possibility is to have all the electronics close to the capacitor in the tank and have a long cable to the display alone. This has a disadvantage in that a large number of connections are required i.e. for a liquid crystal display (which cannot be multiplexed) $3 \times 7$ segments are required for the 3 digits + 1 decimal point + 1 phase (back plate) = 23. Hence a 23 multicore cable is required which may be uneconomic although the original disadvantage has been removed. The optimum solution known to the inventors will now be described with reference to FIG. 3.

The three multivibrators 101, 102 and 120 in a pre-unit operate as in FIG. 1 except that it is preferable to inhibit the counters 103, 104 and 106 from counting rather than the multivibrators 101, 102 and 120 from oscillating provided that enough pulses are counted from each multivibrator without interruption so that the inherent random error of ±1 pulse is insignificant.

Multivibrator 120 in FIG. 3 is gated in at any point in its cycle and so its output must be divided by 64 to provide an only 3% of oil gallons in the reading. Thus the Q6 output of the binary divider 106 is fed to the decade counter 21. In order to fulfil the requirement that the three multivibrators in the pre-unit should operate at roughly the same speed for, say, an average reading at 10.0 gallons, so that the respective errors are roughly the same, the binary dividers 103 and 104 need to operate at seven binary stages higher i.e. using their Q13 outputs for 128 further divisions.

The embodiment of FIG. 3 has several advantages. All three multivibrators can be assembled using the six inverter gates of a single hex inverter chip (CMOS MC 4069). This provides for much self compensation because variations of gate characteristics within a single chip are much less than from chip to chip. The characteristics include threshold voltage variation, temperature effects, ageing effects and supply voltage variation. Anything which affects all three multivibrators by the same amount will not affect the reading. These advantages are in addition to those obtained by using three vibrators of the same type, monostable or multistable, and preferably the latter. The various Q outputs from the counters for use are chosen so that all three multivibrators operate at approximately the same frequency; at full reading multivibrators 101 and 102 are almost of equal frequency. Hence any time ageing effect, due to total work done by each gate, is minimised.

In the circuit of FIG. 3, resistors $R_1$ and $R_4$ protect the input and output of the inverter gates respectively in case the measurement capacitor $C_{11}$ is shorted to the car earth etc., so that once the fault is corrected, the whole unit will function normally. Capacitors $C_1$ and $C_2$ are the capacitances of the two screened cables connecting the gauge $C_{11}$ to the inverter chip. It is found with these additional components that the voltage immunity of the pre-unit was lost so additional components $C_3$, $R_2$, $R_3$, $R_5$ are added empirically to regain its voltage immunity.

The outputs of the three multivibrators are connected to the rest of the circuit by a long cable (5 core—2 wires for power supply) screened to prevent radio interference and to give protection against mechanical wear and abrasion. Respective gates 1, 2 and 3, inverting or non-inverting, are used as buffers to prevent the capacitive load of the 5-core cable from affecting the running of the multivibrators. Resistors $R_6$, $R_7$, $R_8$ protect the outputs of those gates 1, 2 and 3 from being overloaded in case the 5-core cable is accidentally cut and the wires shorted.

By placing the pre-unit close to the measurement capacitor or in the ultimate by placing the pre-unit on top of the capacitor itself the relatively small importance of $C_1+C_2$ enables $C_{11}$ to be built with a smaller capacitance and renders $C_3$ unnecessary. The pre-unit is vulnerable to moisture, condensation and the like and should be adequately protected, i.e. mounted in rubber or placed in a sealed container or at least coated with a moisture repellant such as silicon grease.

An important advantage in splitting the pre-unit from the main unit and rendering it integral with the capacitor $C_{11}$ as a fuel tank unit is that the once and for all calibration of $R_{12}$ and $R_{13}$ to allow for manufacturing variations in the values of $C_{11}$, $C_{12}$, $C_{13}$, $R_{11}$, $R_{12}$ and $R_{13}$ and perhaps in the exact shapes of individual tanks is made only within the tank unit itself. Thus all main units are interchangeable and would produce identical readings if connected to the same pre-unit.

The main unit has three inputs which are buffered first by gates 4, 5 and 6 which may be inverting or non-inverting. Resistors $R_{17}$, $R_{18}$ and $R_{19}$ protect the inputs of gates 4, 5 and 6 in case the cable is disconnected as inputs to CMOS circuits should never be left "floating". Resistors $R_9$, $R_{10}$ and $R_{16}$ together with the input capacitance of each input gate (5pF) act as low pass filters to prevent high frequency noise, if any, from reaching the gates. Comparing FIG. 3 with FIG. 1, the reset monostable 140 is replaced by a reset RS latch 240.

When the output of a three input AND gate 150 goes high, clock input is low (negative-edge counter) and output of 150 is transferred to output of a gate 152 which feeds back to the other input of a gate 151 so that the output of gate 152 remains high after gate 150 output goes low again until gate 152 output is reset low again by a high clock pulse from output of gate 4.

The "latch off" circuit 142 of FIG. 1 is replaced by a gate 153. The Q outputs from counter 103 are so chosen that the "latch-off" pulse from gate 153 ends before the reset pulse from gate 150 begins. This arrangement eliminates the need for additional components.

The "latch off" pulse passes through a gate 156 to the latch input of the display unit 21 if the following conditions (a) or (b) or both are met.
(a) Output Q6 from 106 is low (½ latch Schmitt trigger). This trigger can be arranged to latch onto the first ½ or the second ½ of each number, but it is preferred to latch onto the second ½ so that a true zero will always be unlatched.
(b) Q2 of binary counter 107 is low—this is explained as follows:
If when switching on the unit the reading happens to be a latched number, then the display will show any random number or zero depending upon the output characteristics of the latches when first switching on. In addition the first one or two real readings tend to be inaccurate due probably to the rising voltage (switching on time) during those measurements. It is desirable therefore to hold off the latch irrespective of the Schmitt trigger ½ latch until at least three readings or more (about 1 second for example) have been measured. This is done by the binary counter 107. All counters when switching on apparently always do so with their Q outputs low. Counter 107 therefore counts the number of reset pulses via gate 154 (i.e. the number of readings) until its Q2 output goes high. This then feeds back into gate 154 and inhibits the clock input from further counting. Therefore Q2 remains high until the unit as a whole is switched off. Counter 107 is never reset via the reset input. It is also useful to gate the Q2 output of counter 107 into the blanking system of the display to prevent erroneous readings from being displayed during the first second of operation.

If either of the connections in the cable from the pre-unit multivibrators 102 or 120 are cut accidentally then the displayed reading will be unlatched zero (fail safe). However if the connection from 101 is cut or the measurement capacitor is shorted out, then the previous reading will remain permanently until the unit is switched off because the reset RS latch will not produce any more pulses. This can be prevented by having an additional oscillator (not shown in FIG. 3) with its own counter in the main unit. This counter is continuously reset by the reset pulse so that a particular Q output is never reached by the counting. This output is fed into the reset of counter 107 instead of the permanent "0" connection shown in FIG. 3. If the reset pulse fails to operate then the Q output goes high and operates a warning by permanently resetting counter 107 and hence blanking the display permanently. The decimal point need not be blanked to enable the viewer to distinguish between whether the display is being blanked due to a fault or whether no power is reaching the unit. This oscillator is also useful for providing a reliable source for multiplexing pulses for an LED display and "phase" pulses for a liquid crystal display. Both types of display can be damaged if they receive power but no multiplex or phase signals.

If an automobile possesses a microprocessor, then the required information can be fed into it directly in a binary form from the Q outputs of 106, Q6 up to the largest number required (possibly Q13) via a bank of latches in parallel, controlled (opened) by the output of gate 156. An 8 bit latch, possibly with 3-state outputs would be required for an 8 -bit parallel input port into a microprocessor.

Suitable values of resistance and capacitance in FIG. 3 may be:

$R_1=R_2=R_3=R_4=R_5=R_6=R_7=R_8=1$ kilohm.
$R_{17}=R_{18}=R_{19}-1$ megohm
$R_9=R_{10}=R_{16}=100$ kilohm
$C_1=C_2=$less than 10 pF
$C_3=$less than 20 pF
$C_{11}(empty)=C_{12}=C_{13}=200$ picofarad Gate 157 in FIG. 3 is shown as a 3-input AND partly for ease of reference with gate 105 of FIG. 1. The input to this gate from the Q13 of counter 103 is unnecessary as in the case of gate 105 of FIG. 1 and a two input AND gate would suffice. The logic is neater, in this case, however, with the three-input AND gate because the reset pulse R generated by the latch 240 is delayed beyond the end of the Q13 pulse from counter 103 by the addition of the Q1 and Q3 outputs to the triggering gate 150.

MINIMAL MAIN UNIT

Figure 4:
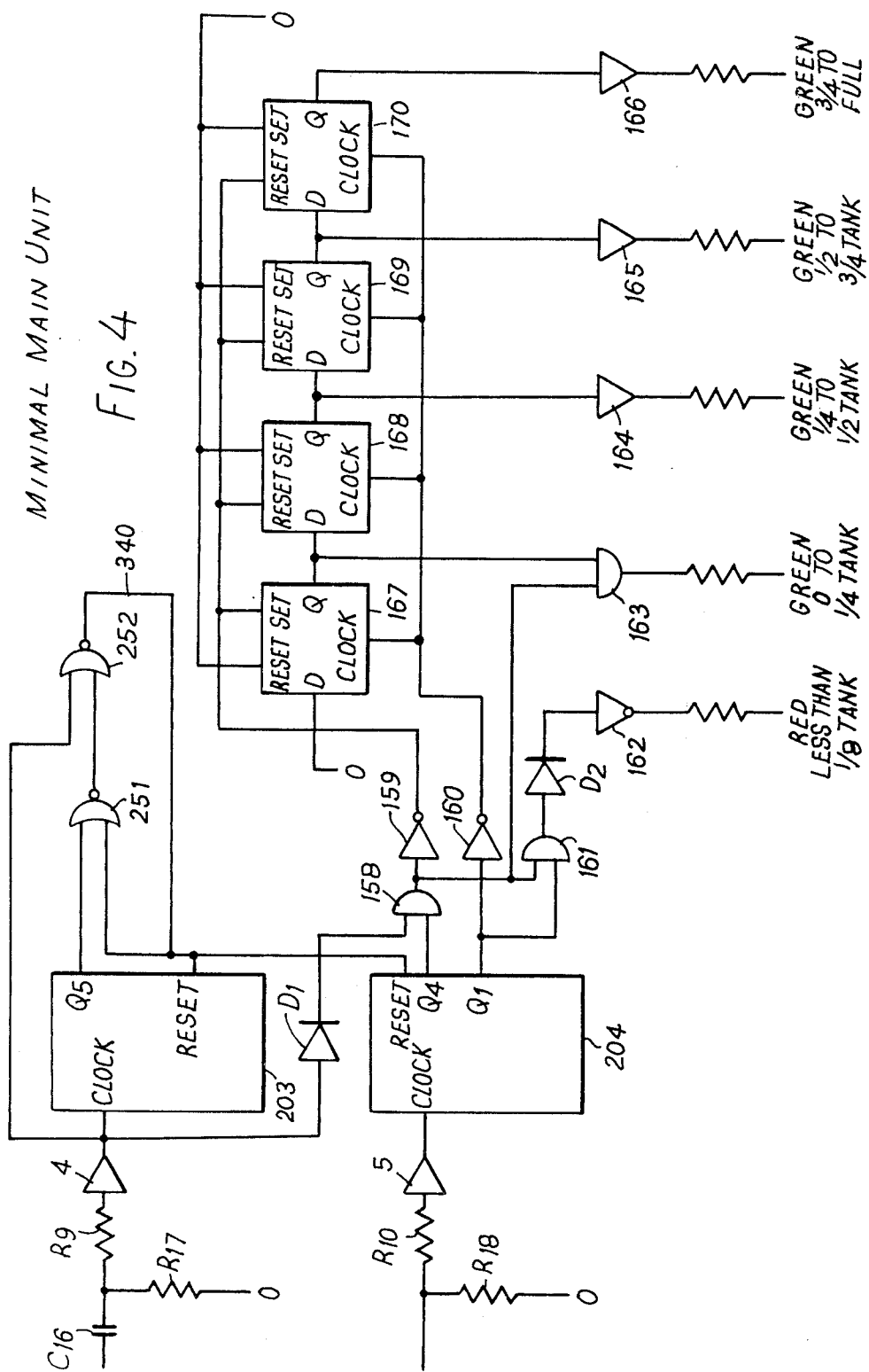
FIG. 4 is a circuit diagram of a main unit of another embodiment of the invention for providing a minimal display of volume measurement.

A full digital display, whether L.E.D., L.C.D. (liquid crystal display) or any other type is expensive. The pre-unit together with its measurement capacitor is relatively cheap particularly because a three-plate capacitor is adequate in the pre-unit. In the interests of economy a full digital display can be shared with other functions such as trip mileage and time, the driver selecting whichever he requires with a switch. In this case a permanent display is needed providing an at a glance indication of whether the tank is full or empty and a few states in between, much as with the conventional fuel gauge. This display and associated circuitry should use the same pre-unit and be run in parallel with the digital main unit. In economy models the minimal main unit can be used as an alternative to the digital main unit and so must be cheap. An example of a minimal main unit is shown in FIG. 4. It uses the outputs from only two of the multivibrators 101 and 102 in the pre-unit. These are passed into the same combination of $R_9$, $R_{10}$, $R_7$, $R_{18}$ and gates 4 and 5 as in FIG. 3. In this case however $C_{16}$ (typical value 0.01 $\mu$F) is added to ensure that the output of buffer gate 4 is low even if the lead from 101 of the pre-unit is shorted permanently to a high. There is no longer the need for the large Q outputs used in the counters 103 and 104 of FIGS. 1 and 3 and much smaller counts are used, for instance the Q4 and Q5 outputs of negative edge triggered binary counters 204 and 203 respectively, shown in FIG. 4. This makes the reset pulse generated by the reset RS latch 340, equal to half the input clock cycle, last for 6% of the Q4 cycle of the counter 203. The reset RS latch 340 operates in a similar manner to circuit 240 in FIG. 3, being triggered at the end of the Q4 high output of counter 203, that is, when the Q5 output goes high. As explained before, this defines the period of overlap of the Q4 cycles of counters 203 and 204 without the need for an AND gate equivalent to the NAND gate 105 in FIG. 1. This circuit is designed specifically for use with the pre-unit shown in FIG. 3 where the value of capacitor $C_{11}$ even if only a three-plate capacitor, is large compared with those of $C_1$ and $C_2$ due to the proximity of the parallel plate capacitor to the rest of the pre-unit. This means that the time period of multivibrator 101 is approximately doubled when the fuel tank is filled from empty with petrol. The basis of the circuit shown in FIG. 4 is the chain of four D-type flip flops 167, 168, 169 and 170. These each have an input terminal D whose logic state is transferred to the output Q during a positive-going clock transition. Separate set and reset inputs are also provided. A high logic level on these sets the value of Q at 1 or 0 respectively. The inverter 159 ensures that the Q output of flip flop 167 is "1" and that of 168, 169 and 170 is "0" up to the beginning of the Q4 high output of counter 204 while an AND gate 163 ensures that the Q output of flip flop 167 fails to reach its respective L.E.D. until the beginning of the Q4 high output pulse. The Q1 output of counter 204 is inverted at a gate 160 so that the output of gate 160 goes high at the start of the high Q4 pulse, and again ¼ of the time through it, half way through it, ¾ of the time through it and finally at its conclusion. The output of 160 is fed to the clock terminals of the four flip flops so that the high output originally only on 167 is transferred progressively to 168, then 169 and finally to 170 during the Q4 high output of counter 204. The permanent "0" logic on the D input of 167 ensures that all subsequent transfers from 167 following the first are low so that only one flip flop output is high at any one instant in time. The Q outputs of the flip flops will not progress at the beginning of the Q4 high output of counter 204 because the Q1 inverted output of gate 160, which controls the progression via the clock inputs of the flip flops, goes high momentarily before the Q4 high output begins due to propagation delays in the counter. The flip flop outputs are buffered and fed via transistors to a row of L.E.D.'s so that each L.E.D. is on when its respective buffered Q output is high. The amount of fuel in the tank governs the timing of the reset pulse from latch 340 and so the duration of the Q4 high output of counter 204. For a full tank, starting from the termination of the reset pulse, the sequence of events is as follows:

All four L.E.D.'s remain off during the first ½ cycle of the Q4 output of counter 204, then, when Q4 goes high the ¼ tank L.E.D. switches on for the duration of a complete Q1 cycle of counter 204. Upon completion of this cycle the ¼ tank L.E.D. switches off and the ½ tank L.E.D. switches on for the duration of the next complete Q1 cycle and so on until each L.E.D. has been switched on in turn for the same duration. For a tank less than full this sequence is interrupted before completion by the reset pulse so that not all the L.E.D.'s, if any at all, receive a full Q1 cycle duration of counter 204 in the "ON" state. The total amount of light emitted from the L.E.D.'s is thus a measure of the volume of fuel in the tank.

The operation of the unit is much faster than flicker-vision. Each L.E.D. when fully "ON" is switched on in reality for only ⅛ of the time and so is provided with a power supply eight times more powerful than its rated value. Precaution must therefore be made that the operation of the unit is never frozen at one point in its cycle by the cutting or shorting of an input wire, leading to the rapid burning out of one L.E.D.

AND gate 158 acts as an ordinary buffer during normal operation due to the input capacitance of its extra input being "pumped up" by gate 4 via diode $D_1$. If the output oscillations from multivibrator 101 in the pre-unit fail to reach $C_{16}$, then the output of 4 remains low, disabling the output of 158 to low and hence switching off all four L.E.D.'s.

A red warning L.E.D. which operates if the tank is less than ⅛ full is also provided. If Q1 of counter 204 goes high during the time Q4 is high then more than ⅛ of a tank of fuel is present and the output of gate 161 goes high. Periods of time during which 161 output is high "pump up" the input capacitance of the inverting buffer 162 via diode $D_2$ switching off the red L.E.D.

This system can be modified for different types of display, e.g. liquid crystal, and can be easily altered to provide a more precise analogue readout. For instance, a display of 8 L.E.D.'s can be accomplished by changing Q5 to Q6 on counter 203, Q4 to Q5 on counter 204 and by doubling the number of D type flip flops.

Considering now the embodiments of FIGS. 1, 3 and 4, the features of the invention can be identified as follows.

For FIGS. 1 and 3 the capacitor whose capacitance varies with the volume of a liquid when present in the container is the capacitor $C_{11}$. The capacitor $C_{11}$ is so included in an oscillator, which is the multivibrator 101, that the fundamental frequency of the oscillator varies in an inverse manner with the capacitance of the capacitor $C_{11}$. The oscillator 101 forms part of an electrical signal generating means which also includes the counter 103 and the reset monostable circuit 140 or the reset latch 240 which in operation repeatedly generates a signal the duration of which is a measure of the volume of the liquid. This signal is the "space" signal which appears between successive reset signals produced by the circuit 140 or latch 240 and its duration is the interval between successive reset pulses. Measuring pulse generating means is constituted by the multivibrators 102 and 120 and the counters 104 and 106, the counter 106 producing at its Q5 or Q6 output in response to each received space signal from the circuit 140 or latch 240 a number of pulses which number is a measure of the duration of the received space signal. Measurement signal generating means in the form of the display unit 21 is connected to receive the said pulses from the counter 106 and generates measurement signals related to the numbers of pulses received from the counter 106 and representative of the volume of liquid.

The minimal main unit of FIG. 4 is combined with the two multivibrators 101 and 102 of FIG. 3 to form an embodiment of the present invention. Thus the capacitor whose capacitance varies is again the capacitor $C_{11}$ and the oscillator whose frequently varies is again the multivibrator 101. The electrical signal generating means in this embodiment includes the multivibrator 101, the counter 203 and the reset latch 340. The reset latch 340 repeatedly generates, in operation, a space signal the duration of which is a measure of the volume of liquid, this space signal again being the 'low' which appears between successive reset pulses produced by the latch 340. The measuring pulse means is constituted by the multivibrator 102 and the counter 204, the counter 204 producing at its Q1 output in response to each received signal from the latch 340 a number of pulses which is a measure of the duration of the received space signal.

Measurement signal generating means are provided in the form of the D flip-flops 167 to 170 and the various gates and display circuitry and devices connected thereto.

With regard to the counters 103, 104, 106, 107, 203 and 204, the following practical considerations are relevant.

Commercially available binary counters such as the MC 104024 seven-stage ripple counter or the MC 14020 14-bit binary counter have the following characteristics.
(1) A high on the common reset terminal resets all Q outputs to zero.
(2) The Q output of each stage changes state on a negative-going edge on its input clock.
(3) Each Q output is the clock input of the next binary counter stage except for the last Q output and for the very first counter stage which has an external clock input.
(4) Therefore, as any Q output changes state to either high or low, the outputs of all preceeding counter stages change from high to low.
(5) These changes are not exactly synchronous but occur in sequence from the lower Qs to the higher with a delay, measured in nanoseconds between each successive stage.

Figure 8:
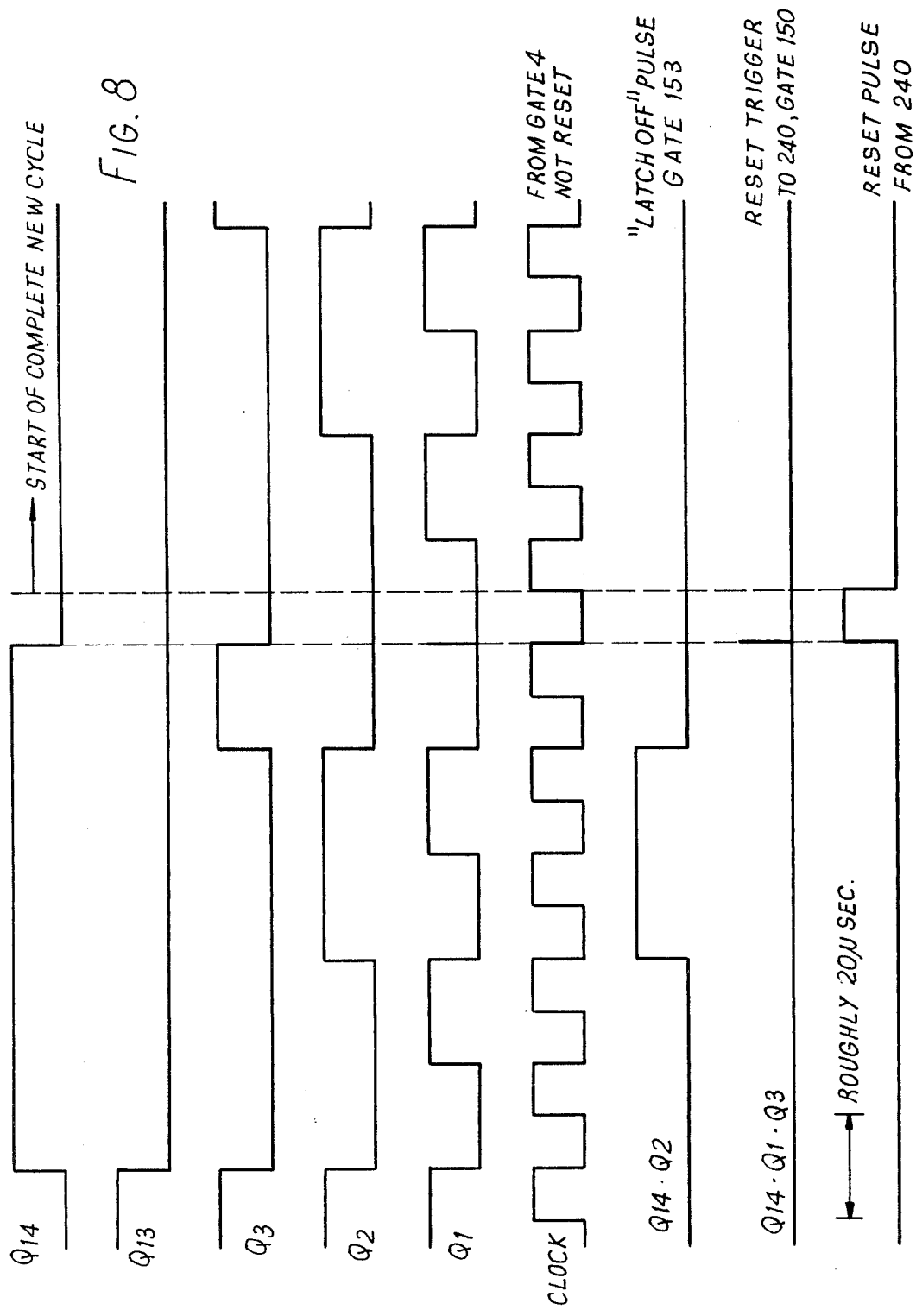
FIG. 8 is a graphical representation of waveforms occurring at a petrol counter in a main unit of the embodiment of FIG. 3.

FIG. 8 shows part of the waveforms of the binary counter 103 and associated logic gates in FIG. 3. That part of the cycle shown in FIG. 8 is where the first and only period of Q13 being high following the counter being reset is ended. At this time Q14 goes high and all other Q outputs, Q13 included, go low. Q14 is gated with Q1, Q2, and Q3 to then provide, in sequence, and with an appreciable time gap between them, a "latch off" pulse and a reset trigger pulse. Q14 and Q2 are combined in the AND gate 153 to provide the "latch off" pulse and Q14, Q1 and Q3 are combined in the three input AND gate 150 to provide a reset trigger pulse to the RS latch 240. This reset trigger pulse is very short because, of course, it resets counter 103, including Q14, Q1 and Q3 itself. Latch 240 extends this pulse to roughly 10 μ sec because it is reset only this extent of time later by the clock pulse, i.e. the pulse from gate 4, going positive. (The clock pulse always goes negative at the same time that any change occurs in any Q output). The clock pulses are not affected by the reset, and as soon as the reset latch 240 goes OFF, counter 103 recommences counting the clock pulses in the normal manner, starting a whole new cycle. A reset pulse of appreciable length, such as that provided by latch 240, is necessary, because it also resets binary counters 104 and 106 and the decade counter of display unit 21.

Figure 9:
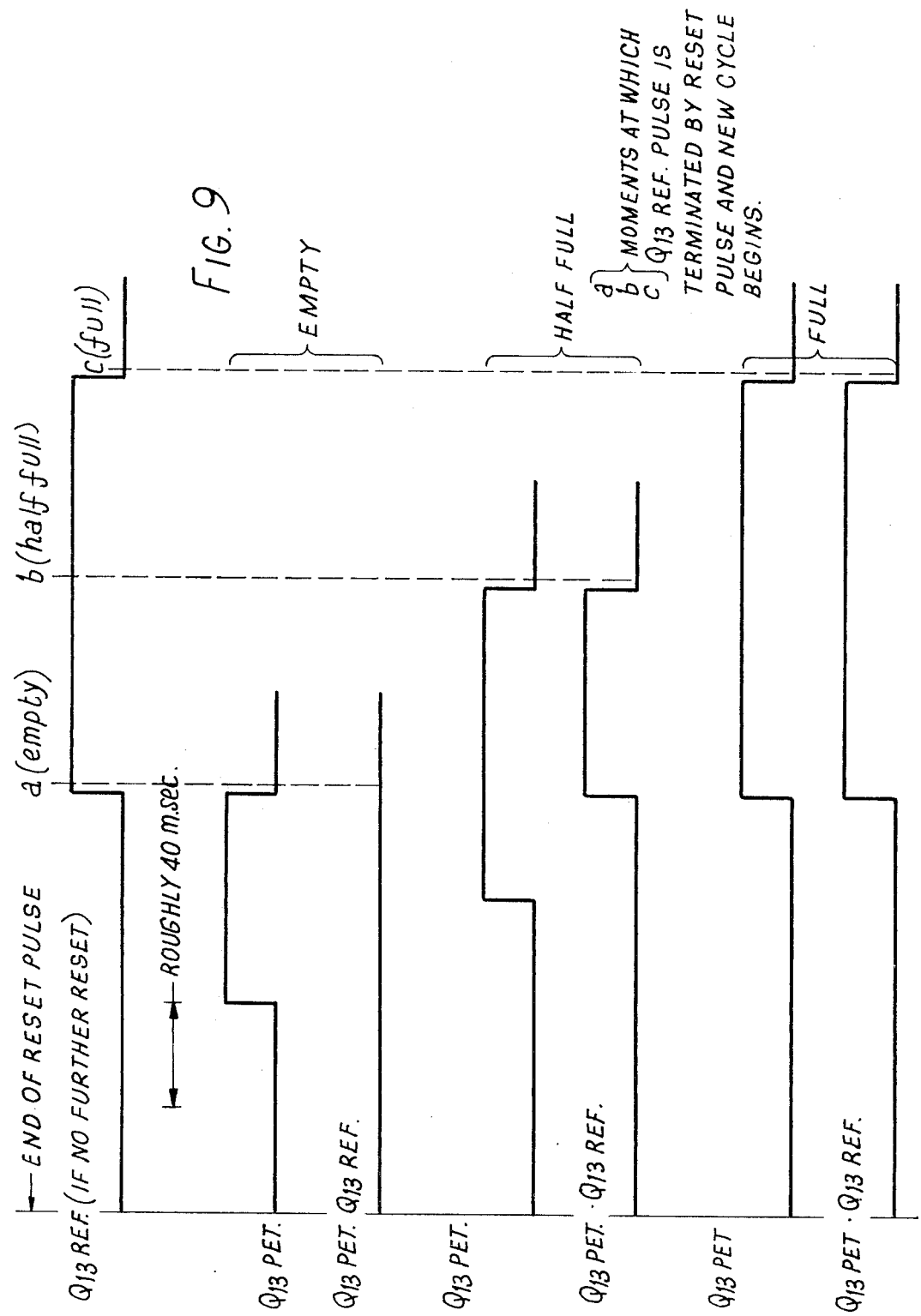
FIG. 9 is a further graphical representation of waveforms occurring in the main unit of the embodiment of FIG. 3, comparing the petrol counter with a reference counter.

The sequence of events which occurs in the petrol counter 103 is self-sustaining and will continue indefinately without reference to any other counter. FIG. 9 shows that on filling the petrol (fuel) tank with petrol i.e. gasoline, thereby increasing the time period of multivibrator 101, likewise increases the time period of the Q13 output along with those of all the other Q outputs of the petrol counter 103. If the capacitance of the leads $C_1$ and $C_2$ in FIG. 3, is small, the time period of the Q13 output of counter 103 will roughly double upon filling the petrol tank, although this criterion is not essential for the proper working of the circuit in FIG. 3.

$R_{12}$ of reference multivibrator 102 is adjusted so that its time period is exactly twice that of multivibrator 101 when the petrol tank is empty. It is thereby calibrated and is not then adjusted further. The resulting Q13 output of the reference counter is shown on the top waveform in FIG. 9. The first positive edge of the reference Q13 REF then coincides with the negative edge of the petrol Q13 PET when the petrol tank is empty, if both counters 103 and 104 commence counting at the same time, as when following the end of a reset pulse.

The reset pulse, generated by the petrol counter 103 and its associated gates also resets the reference counter 104. Thus when the petrol tank is empty, the Q13 output of the reference counter does not go high at all as this counter is continually reset before this stage can be reached. When the petrol tank is full, nearly all the reference Q13 cycle is allowed to be completed before the reference counter 104 is reset.

The length of the 'high' period of the reference counter Q13 output is thus directly proportional to the amount of petrol in the tank. FIG. 8 shows that the reset pulse in fact occurs roughly 100 $\mu$second after the end of the petrol counter Q13 period. This 100 $\mu$second period of time is shown exagerated in FIG. 9 where it is seen that an AND gating of the Q13 petrol and Q13 reference outputs is necessary if this short time period is not to contribute to the reading. However, the time period involved represents little more than 0.01 gallon which clearly could be neglected. $2^{13}$ or 8 192 of the respective clock pulses are required to make each complete (low and high periods) Q13 cycle in either counter 103 or 104. In this period of time, the Q6 outputs of these counters oscillate $8192/2^6$ or 8192/64 or 128 times. They therefore oscillates 128/2 or 64 times during the "high" period only of a complete Q13 output cycle. If the average petrol tank holds 6 gallons rather than 3 or 12 gallons, it can be seen that when the third multivibrator 120 is gates in via AND gate 157 to the length of the reference counter Q13 output high period to provide a count in gallons and tenths of gallons the inclusion of the third binary counter 106 and the use of its Q6 output enables the third oscillator 120 to be run at roughly the same speed as the petrol and reference oscillators 101 and 102 respectively. Thus although the exact speed of this oscillator must be adjusted via $R_{13}$ to provide the correct reading for a full petrol tank, $2^6$ or 64 clock pulses from oscillator 120 contribute to each 0.1 gallon (Q6) output from counter 106. This counter 106 is reset via the common reset pulse from latch 240. When the reset pulse comes off, the clock input of the counter 106 may just be about to receive a negative edge, or the negative edge may be almost one clock cycle away. There is a random error of $(0.1 \times 3)/64$ gallons in each reading due to this effect in each of the counters 103, 104 and 106 but the Schmitt trigger system in the latch circuitry which involves a hysteresis of 0.05 gallons or 32 clock cycles deals with this error easily.

Counter 106 must be reset or else the Q6 output itself could be at any stage in its cycle at the moment the clock pulses from oscillator 120 are gated in via gate 157 at the start of each reference Q13 "high" period. This would create a random error of a whole 0.1 gallon.

FIG. 10 shows that the operation of the minimal unit is very similar to the above. For this minimal unit to operate it is essential that $C_1$ and $C_2$ are small relative to $C_{11}$ in the pre-unit of FIG. 3 so that the time period of oscillator 101 is very nearly doubled when the petrol tank is filled. As a count is required using units of $\frac{1}{4}$ tank rather than tenths of a gallon, much lower Q outputs can be used. The overlap of the Q4, rather than the Q13, outputs of the petrol and reference counters is compared. Therefore the reset pulse from latch 340 is similar to that from latch 240 in being $\frac{1}{2}$ clock cycle long, but is generated by the beginning of the petrol counter Q5 high period rather than the petrol counter Q14 high period. The amount of petrol in the tank determines the length of the reference Q4 REF high period, before it is ended by the reference counter being reset. Instead of this period being divided into units of 0.1 gallons by a third oscillator and counter, it is divided into four one quarter periods by use of a lower Q stage of the reference counter itself. Use of three Q outputs lower divides the total Q4 period into $2^3$ or 8, and so the Q4 high period into quarters. It is thus the reference Q1 which drives the clock inputs on all four 'D' type flip-flops in FIG. 4. Reference Q1 must be inverted to provide $\overline{Q}_1$ REF, however, as the flip-flops are positive edge triggered. Inverted Q4 holds flip-flop 167 at high via 'set' and flip-flps 168, 169 and 170 at low via 'reset' until the beginning of the Q4 high period; gate 163 is an AND gate to prevent its output being high during the Q4 low period. Gates 163, 164, 165 and 166 are then sequentially at high during the high period of the reference Q4 REF.

FIG. 10 shows that if the petrol tank is $\frac{3}{8}$ full, for example, the reset pulse continually interupts this sequence halfway through the time when 164 is high. Gate 163 continually goes high for its full time possible while 165 and 166 do not go high at all. The result is that the "FULL" and "$\frac{3}{4}$ FULL" LEDs remain dark, the "$\frac{1}{4}$ FULL" LED appears bright and the "$\frac{1}{2}$ FULL" LED appears dim. This circuit is easily modified to provide $\frac{1}{8}$ or 1/16 tank LEDs.

We claim:

1. Capacitive measuring apparatus comprising:

capacitor means having a capacitance which varies with a parameter to be measured;

first multivibrator means which so includes said capacitor means that the repetition rate thereof is consequently varied in an inverse manner with the capacitance of said capacitor means;

pulse counting means coupled to said first multivibrator means to receive pulses generated in the multivibrator means;

resetting means coupled to said counting means to be triggered by an output of said counting means when a predetermined number of the said pulses has been counted so that a train of resetting signals are generated separated by intervals the length of which is a measure of the capacitance of said capacitor means;

measuring pulse generating means for generating measuring pulses of fixed repetition rate being coupled to said resetting means to be gated by the resetting signals to produce batches of measuring pulses;

digital display means for displaying a reading representative of the number of pulses in each of the said batches, so that the display number is dependent on the capacitance of the capacitor means and hence on the parameter to be measured; second multivibrator means; second pulse counting means coupled to said second multivibrator means to receive pulses generated in said second multivibrator means and to provide a predetermined output signal on reaching a predetermined count, said second counting means being coupled to said resetting means to be reset by said resetting signals; and said measuring pulse generating means comprising a third multivibrator means of fixed repetition rate and third pulse counting means coupled to said third multivibrator means to receive pulses generated in said third multivibrator means in intervals each starting at the occurrence of said predetermined count in said second counting means and ending substantially at the occurrence of a resetting signal generated by said resetting means, said third counting means being coupled to said resetting means and being adapted to provide said measuring pulses, each said batch occurring in a respective one of said intervals starting at the occurrence of said predetermined count.

2. Capacitive measuring apparatus as claimed in claim 1, wherein said capacitor means comprises a measurement capacitor, the apparatus further comprising a fuel tank in which said measurement capacitor is so mounted that its capacitance varies, in operation, with the level of fuel in the tank.

3. Capacitive measuring apparatus as claimed in claim 2, wherein said capacitor is so shaped and arranged that the capacitance thereof as determined by the fuel level is representative of the volume of fuel in the tank.

4. Capacitive measuring apparatus as claimed in claim 3, wherein said second multivibrator means and said second pulse counting means are such that said predetermined count corresponds to a reading of said digital display means for zero volume of fuel in said tank.

5. Capacitive measuring apparatus as claimed in claim 1, wherein said resetting means is coupled to said first and second multivibrator means to supply resetting signals thereto.

6. Capacitive measuring apparatus as claimed in claim 1, wherein the first said pulse counting means is adapted to provide unlatching pulses to said display means, said display means having a latch input coupled to said first pulse counting means.

* * * * *